J. DI NAPOLI.
AUTOMOBILE LOCK.
APPLICATION FILED MAY 13, 1919.

1,402,150.

Patented Jan. 3, 1922.

Inventor:
Joseph Di Napoli,
By ____ Denny
Attorney.

UNITED STATES PATENT OFFICE.

JOSEPH DI NAPOLI, OF PHILADELPHIA, PENNSYLVANIA, ASSIGNOR OF ONE-HALF TO LOUIS E. LEVINTHAL, OF PHILADELPHIA, PENNSYLVANIA.

AUTOMOBILE LOCK.

1,402,150.  Specification of Letters Patent.  Patented Jan. 3, 1922.

Application filed May 13, 1919. Serial No. 296,784.

*To all whom it may concern:*

Be it known that I, JOSEPH DI NAPOLI, a subject of the King of Italy, who have declared my intention of becoming a citizen of the United States, residing in the city of Philadelphia, county of Philadelphia, and State of Pennsylvania, have invented certain Improvements in Automobile Locks, of which the following is a specification.

My improvements are designed to provide an attachment for securing in position the shift gear lever of an automobile; and my objects are to provide a lock of simple, inexpensive and durable construction which can be readily applied to existing vehicles, which cannot be readily forced, and which while preventing the mechanical operation of the car from its motor will not interfere with its manual movement in case of necessity.

Figure 1:
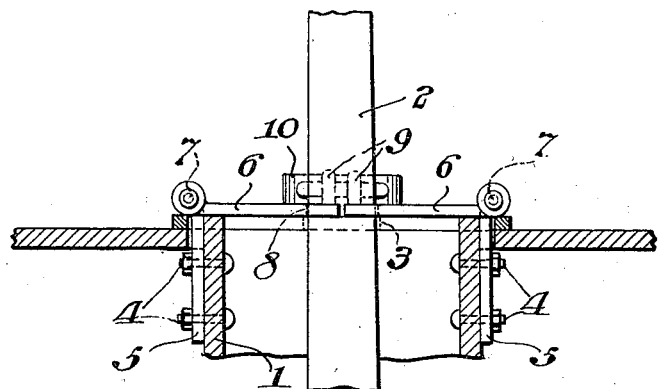
Figure 2:
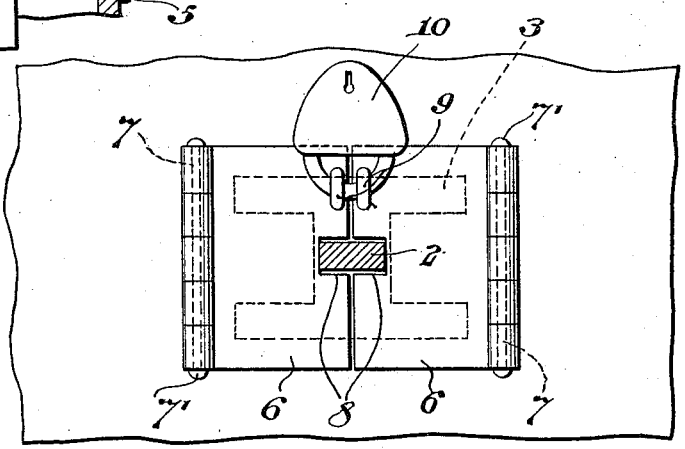
Figures 3, 4:
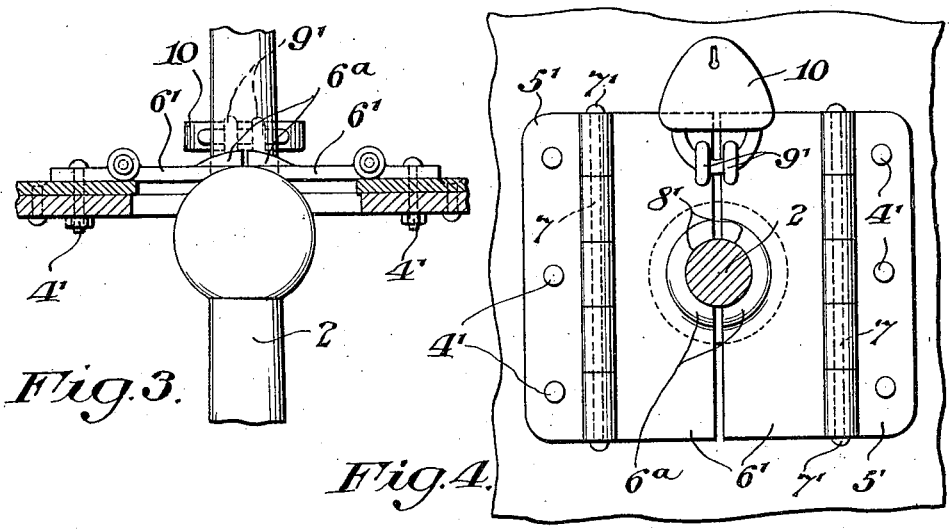

In the drawings, Fig. 1 is a vertical sectional view of a part of an automobile gear box and shifting lever having my improved lock applied thereto; Fig. 2 is a top plan view of the same; Fig. 3 is a vertical sectional view of a different form of automobile gear box and lever having a modified form of my improved lock applied thereto; and Fig. 4 is a top plan view of the same.

As illustrated in Figs. 1 and 2 of the drawings, a gear shift box 1, having a shifting lever 2 movable in the H-slot 3, has fixed to the sides thereof by bolts 4 the hinge leaves 5 connected to movable hinge leaves 6 by pintles 7 having upset ends 7'. The hinge leaves 6 contain the complementary recesses 8, permitting the leaves to embrace the lever 2 when it is in neutral position, the leaves fully covering the H-slot so that no purchase can be obtained for forcing the lock. The leaves 6 are provided adjacent to their inner edges with eyes 9 which, when the leaves are closed, are in juxtaposed position and through which may be passed the bow of a padlock 10 to secure the leaves in closed relation.

As illustrated in Figs. 3 and 4, my improved lock is applied to a ball-joint shift lever. In this construction, the leaves 5' are secured by bolts 4' to the top of the gear box or the floor of the car and have hinged thereto the leaves 6' having expanded sections 6ª conforming to the contour of the ball of the lever. The leaves 6' are provided with recesses 8' for the reception of the gear shift lever when the latter is in neutral position, and with eyes 9' through which may be passed the bow of a padlock 10 for securing the leaves in place.

It will be understood that the recessed leaves are normally turned back from the shifting lever, which can then be readily moved to shift the gears into driving relation. When the car is to be locked, the recessed leaves are turned toward and engage the shifting lever which is thereby held in neutral position, the leaves being secured together by the padlock engaging their eyes.

Having described my invention, I claim:

1. In a device of the character described, the combination with a gear shift lever, of a pair of leaves hinged on independent parallel axes disposed transversely to and on opposite sides of said lever, said leaves containing complementary recesses in which said lever is adapted to be engaged, and means for locking said leaves together.

2. In a device of the character described, the combination with a gear shift lever, of a pair of leaves respectively rotatable on parallel horizontal pivots disposed on opposite sides of said lever and containing complementary recesses in which said lever is adapted to be engaged, said leaves being provided with eyes adjacent to their juxtaposed edges, and a lock engaging said eyes to fix said leaves together.

3. In a device of the character described, the combination with a gear shift lever, of a pair of leaves respectively rotatable about horizontal parallel axes on opposite sides of said lever and having sections thereof conforming to the contour of said lever, and a lock having a bow engaging said leaves to hold them in juxtaposed relation.

4. In a device of the character described, the combination with a gear shift box and a gear shift lever, of a pair of leaves fixed relatively to said box on opposite sides of said lever, leaves hinged to the leaves first named by horizontal parallel pivots, said second named leaves containing complementary recesses in which said lever is adapted to be engaged, and means for locking said leaves second named in juxtaposed relation.

In testimony whereof, I have hereunto set my name this 29 day of April, 1919.

JOSEPH DI NAPOLI.